Oct. 10, 1933.        J. DUNLOP        1,929,680
QUICK ACTING SAFETY GRIP
Filed Oct. 20, 1930

INVENTOR
James Dunlop.
BY
Wesley G. Carr
ATTORNEY

Patented Oct. 10, 1933

1,929,680

UNITED STATES PATENT OFFICE 1,929,680

QUICK ACTING SAFETY GRIP

James Dunlop, Park Ridge, Ill., assignor to Westinghouse Electric & Manufacturing Company, a corporation of Illinois Application October 20, 1930. Serial No. 489,876

9 Claims. (Cl. 187—89)

My invention relates generally to elevators and, more specifically, to a quick-acting safety grip for use on elevator cars.

Much difficulty is encountered, in the design and operation of elevator safety devices, as a result of the fact that the rail-gripping jaws must be applied with great pressure in order to create sufficient frictional braking force to stop and hold the car, and, in order to generate the force required for setting the jaws with sufficient pressure, it has been necessary to utilize a powerful and heavy mechanism which is inherently slow in operation.

In the operation of the elevator car, the safety jaws must obviously be withdrawn a sufficient distance from the rail to permit the car to move freely up and down the shaft. Consequently, upon the occurrence of any emergency condition initiating the operation of the safety device, the rail gripping jaws cannot become effective to retard the car until all the slack has been taken up between the jaws and the rails, and between all cooperating movable parts of the safety device. The operation of the usual safety-actuating mechanism is so slow that the car may fall a considerable distance and attain a high velocity before the braking device becomes effective.

It is, accordingly, an object of my invention to provide an improved quick-acting safety device.

Another object of my invention is to provide a safety device which will quickly apply a light braking force which will be increased at a slower rate until the car is brought to rest.

A further object of my invention is to provide an elevator safety device which will quickly apply a cushioned equalized braking force that will be thereafter increased at a slower rate until the car is brought to rest.

It is also an object of my invention to provide a safety device in which the slack motion between cooperating parts will be continuously taken up, whereby the device will become effective promptly after its operation has been initiated.

It is a further object of my invention to provide a quick-acting safety device which is simple, dependable and economical.

The invention itself, however, both as to its organization and its method of operation, together with additional objects and advantages thereof, will best be understood from the following description of specific embodiments, when read in conjunction with the accompanying drawing, in which.

Figure 1:
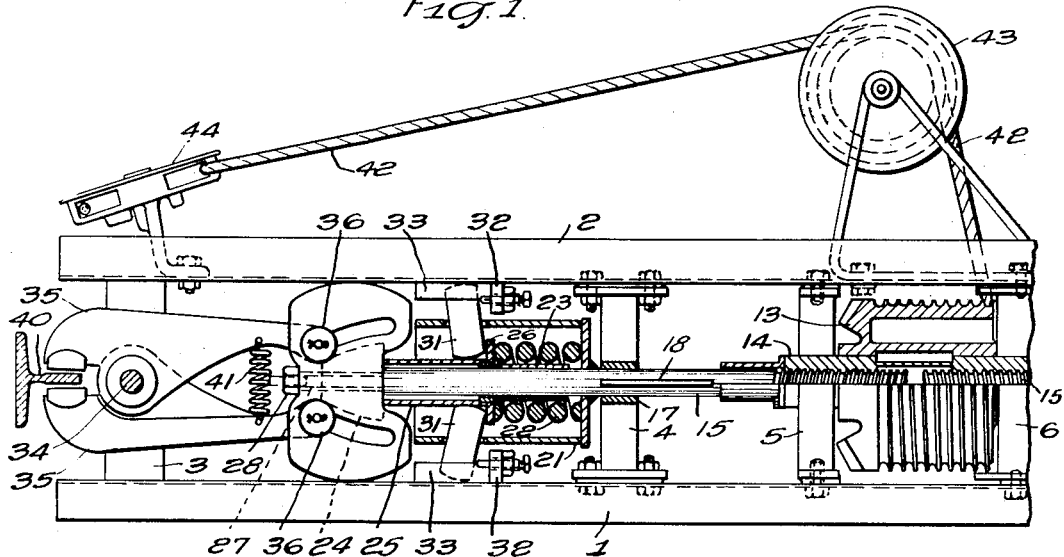
Figure 1 is a plan view, partly in section, of an elevator safety device embodying one form of my invention.

Referring to the drawing, the safety device shown in Fig. 1 comprises a safety frame composed of channel irons 1 and 2 rigidly connected by various cross pieces and brackets 3, 4, 5 and 6.

Figure 2:
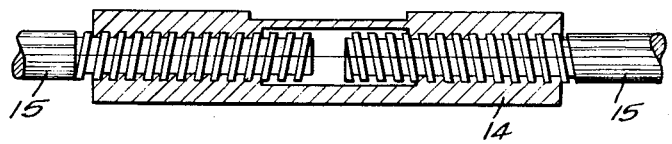
Fig. 2 is a sectional view of an enlarged detail of the device illustrated in Fig. 1.

A safety-cable drum 13 is provided with an internal bushing 14 which extends into the adjacent crosspieces 5 and 6 and rotatably supports the drum. The bushing 14 is internally threaded, having a right-hand thread at one end and a left-hand thread at the other end, as more clearly shown in Fig. 2.

As shown in Fig. 1, a shaft 15 extends through a bearing 17 in the cross piece 4, where it is slidably supported, and is provided with a key 18 carried in a suitable key-way in the shaft 15 and engaging a cooperating groove in the bearing 17, thereby preventing rotation of the shaft but permitting it to slide axially.

Since the structure of the safety device to the right of the drum 13 is identical with that shown on the left-hand side thereof, it has been omitted in order to show the device to as large a scale as possible. It is to be understood, therefore, that another shaft 15 extends to the right of the safety drum 13, in a manner similar to the extension of the shaft 15 to the left-hand side, and that all the elements shown in Fig. 1 are duplicated on the right-hand side of the cable drum.

Rigidly secured to the portion of the shaft 15 which extends beyond bearing 17, is a spring housing 21 of substantially cup-shape. The spring housing may be attached to the shaft in any suitable manner, as by welding, and has its open end adjacent to the outer end of the shaft 15. Concentrically disposed on the shaft 15, and abutting the closed end of the housing, is a compression spring 22 surrounding a spacing tube 23 which is slidably mounted upon the shaft.

An actuator-wedge or conical member 24 is slidably supported on the end of the shaft 15 and is provided with a tubular portion 25 surrounding the end of the shaft 15. A wide flange 26 in the inner end of the tubular portion 25 abuts one end of the concentrically disposed compression spring 22. The inward movement of the slidably mounted actuator 24 is limited by the abutment of the actuator against the end of the shaft 15. The compressed spring 22, however, tends to bias the actuator wedge 24 outwardly away from the end of the shaft 15, and, in order to provide a rigid stop for limiting the movement of the actuator member in this direction, a pin 27 extends axially from the end of the shaft 15 through and beyond the end of the actuator member 24. The pin 27 may be integral with the shaft or it may be joined thereto in any suitable manner. The outer end of the pin 27 is threaded to receive a nut 28 which adjustably limits the extreme outward movement of the actuator 24.

A pair of retaining dogs 31 are provided for normally holding the actuator member 24 in its retracted or innermost position in opposition to the spring 22. The dogs 31 pass through diametrically opposite openings in the walls of the spring housing 21 and are of such length that their innermost extremities engage the flanges 26, and their outermost extremities abut rigid stop members 32 mounted on the sides of the safety frame. The stop members 32 may be adjustable, as shown, whereby the operation of the device may be conveniently adjusted. Guides 33 are provided on the side walls of the safety frame for holding the retaining dogs 31 in position.

A pivot pin 34 is supported by the lower cross-piece 3 and a corresponding upper cross-piece (which has been omitted in order to present an unobstructed view). Pivotally mounted on the pin 34 are rail-gripping jaws 35 which are provided, at one extremity, with rollers 36 which are disposed in cooperative relation to the actuator wedge member 24, and at the other extremity, are spaced to cooperate with a guide rail 40. A spring 41, between the inner ends of the jaw members 35, normally biases the jaws out of engagement with the guide rail 40.

The cable drum 13 normally carries a safety cable 42 which is wound on the drum and has one end anchored thereto. The cable 42 extends from the drum around idler pulleys 43 and 44 to a point of attachment on the usual governor cable (not shown). The safety device is mounted on either the car or the counterweight and, as usual, its actuation is initiated when the safety cable 42 is unreeled from the safety drum 13, thereby causing the latter to rotate.

My invention is best understood, however, when considered with reference to an assumed operation thereof. In Fig. 1 the parts of the safety device are shown in the positions they normally occupy when the safety cable is wound upon the drum, and the elevator car is operating normally.

If overspeed conditions actuate the overspeed governor to trip its cable-gripping jaws, (not shown), the governor cable will be locked in a well known manner, and the continued movement of the car will cause the safety cable 42 to be unreeled from the cable drum 13. As the cable 42 is unreeled, the drum 13 is rotated, and the threaded shafts 15 are forced apart and moved outwardly by the internal right- and left-hand threaded portions of the drum.

The shaft 15, moving outwardly, carries with it the spring housing 21 and the retaining dogs 31. As the spring housing moves outwardly, relative to the stop members 33, a pivoted movement will be imparted to the dogs 31 by the compressed spring 22, whereby the outer ends are held in contact with the fixed stops 33, and the inner ends are moved outwardly at a more rapid rate than the movement of the shaft 15. In other words, the retaining dogs 31 have a combined movement of rotation, about a lateral axis, and translation, and the velocity of the movement of the inner ends thereof is multiplied with reference to the velocity of movement of the shaft 15 and the housing 21. The extent to which the outward velocity of the inner ends of the dogs will be multiplied depends upon the relative dimensions of the cooperating parts, but with parts of the relative dimensions shown, the velocity will be approximately doubled.

Since it is the outward movement of the inner ends of the dogs 31 which releases the flange 26 and permits the compressed spring 22 to force the actuator wedge member 24 outwardly, the velocity of the latter will also be approximately twice that of the shaft. Hence, the actuator wedge members 24 move at high speed to engage the jaws and effect the initial application thereof. The initial braking force applied by the rail-gripping jaws is cushioned and equalized, since it is predetermined by the strength of the springs 22.

After the actuators are applied by their springs 22, the continued outward movement of the shafts 15 causes the actuator springs 22 to be gradually compressed to gradually increase the braking force applied by the rail-gripping jaws. If, however, the braking force is not sufficient to stop the car, the continued rotation of the safety drum 13 caused by the unreeling of the safety cable 42, will eventually apply a positive pressure directly to the actuator wedge member by forcing the end of the slidably mounted shaft 15 directly against the wedge 35, or the end of the spring housing 21 against the tubular spacing member 23. Hence, the braking force applied by the pressure of the jaws 35 on the guide rails 40 will increase until the car is brought to a stop.

Figure 3:
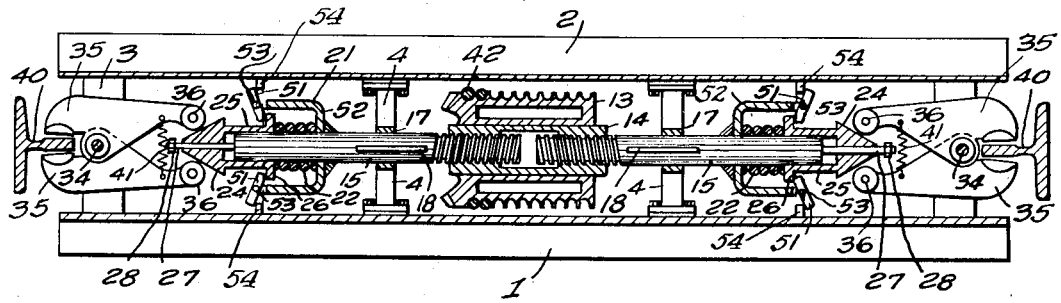
Fig. 3 is a plan view, partly in section, showing a complete elevator safety device constructed in accordance with a modification of my invention.

In Fig. 3, I have shown a modified form of my invention drawn to a smaller scale in order to show the complete device. The general construction of the safety device shown in Fig. 3 is similar to that previously described but it differs therefrom in several specific details. The same reference numerals are applied to the equivalent elements of this modification, and different reference numerals are applied only to those elements which are different from those of the device disclosed in Fig. 1.

The safety frame is constructed of channel members 1 and 2 joined by cross-pieces 3 and 4, substantially as in the device shown in Fig. 1. However, as shown in Fig. 3, the cross-pieces 5 may be omitted by positioning the cross-pieces 4 closer to the drum 13. The safety cable drum 13, the threaded shafts 15, the actuator wedge members 24 and the rail-gripping jaws 35 are similar, and cooperate in the same manner, in both modifications.

In Fig. 3, however, the retaining dogs 51 are pivotally mounted on a spring housing 52 by pivots 53. The pivotal bearings 53 serve to hold the dogs in position and render the provision of guide members unnecessary. Stop members 54 are supported by the side channel irons 1 and 2 in engageable relation to the outer ends of dogs 51. The slidable shafts 15 are of such length that the outer ends thereof will directly engage the actuator wedge members 24, to apply a positive pressure thereto, after the springs 22 have been fully compressed, and the spring housings 52 are rigidly secured thereto as in the first embodiment.

The operation, as set forth with reference to the device shown in Fig. 1, applies equally well to the modified device of Fig. 3 and will not be repeated.

It has been demonstrated that, upon the the actuation of my quick-acting safety device, an equalized cushioned braking pressure will be quickly applied by the rail-gripping jaws to check the speed of the elevator car. If the initial braking force is insufficient to stop the car, the continued motion thereof causes the equalized cushioned braking-pressure to be gradually increased, and, the motion of the car continuing thereafter, a further positive braking pressure of increasing force is eventually applied to the jaws until the car is stopped.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a quick-acting safety device for elevator bodies moving between guide rails, a cable drum, rail-gripping jaws, spring-pressed actuators for moving the jaws to rail-gripping position, retaining means for normally retaining said actuators in retracted positions, and means associated with said cable drum and said retaining means for gradually releasing the actuators to apply the rail-gripping jaws at a rapid rate upon the initiation of rotation of the cable drum, and operative at a slower rate for respectively increasing the compression of the actuator springs including means responsive to operation of the drum for controlling said rapid rate, and means for applying the jaws to the rails with an increasing positive pressure as the rotation of the cable drum continues.

2. In a quick-acting safety device for elevator bodies moving between guide rails, a cable drum, rail-gripping jaws, spring-pressed actuators for moving the jaws to rail-gripping position, means for normally retaining said actuators in retracted positions, including means operative to gradually release the actuators at a rapid rate during the initial rotation of the cable drum and operative at a slower rate to respectively increase the compression of the spring and including means responsive to operation of the drum for controlling said rapid rate, and means to apply a positive increasing force to the rail-gripping jaws as rotation of the cable drum continues.

3. A quick-acting safety device for elevator bodies moving between guide rails comprising a drum rotatable by unreeling a cable therefrom and internally threaded axially, a pair of threaded shafts associated therewith, whereby the shafts will be driven apart when the cable is unreeled from the drum, actuator wedge members slidably mounted on the outer ends of the shafts, springs normally biasing the actuator members outwardly, retaining means normally holding the actuator members in retracted position in opposition to the springs including means for releasing said retaining means whereby the springs are permitted to project the actuators outwardly at a rate more rapid than that at which the shafts are driven outwardly by the drum, and a pair of rail-gripping jaws associated with each actuator wedge member for actuation to rail-gripping position thereby.

4. A quick-acting safety device for elevator bodies moving between guide rails comprising a drum rotatable by unreeling a cable therefrom and internally threaded axially thereof, a pair of threaded shafts associated therewith, whereby the shafts will be driven apart when the cable is unreeled from the drum, an actuator wedge member slidably mounted on the outer end of each shaft, a spring concentrically disposed, and a spring housing rigidly mounted on each shaft, said springs continuously urging the actuator members outwardly, retaining means carried by the spring housings for normally holding the actuator members in retracted position in opposition to the springs and operative for releasing the actuator members to move outwardly at a more rapid rate than that at which the shafts are driven outwardly when the drum is rotated, and a pair of rail-gripping jaws associated with each actuator wedge for actuation to rail-gripping position thereby.

5. In a quick-acting safety device for elevator bodies moving between guide rails, a cable drum provided with an internally-threaded portion extending axially through the drum, one end of which is right-handed and the other left-handed, a correspondingly threaded shaft received in each end of the drum, a wedge actuator member slidably mounted in concentric relation on the outer end of each shaft, a flange on each actuator member, a spring concentrically disposed on each shaft near the outer end for urging the wedge actuator members outwardly, a spring housing rigidly mounted on each shaft, a pair of dogs passing through diametrically opposed openings in each spring housing and so disposed that their inner ends engage the flanges and their outer ends abut rigidly mounted stop members, whereby they normally retain the actuator members in spring-compressing position and are operative when the shafts move outwardly to release the actuators for outward movement at a more rapid rate, and a pair of rail-gripping jaws associated with each wedge actuator member for actuation to rail-gripping position thereby.

6. A quick-acting safety device for elevator bodies moving between guide rails comprising a drum rotatable by unreeling a cable therefrom and internally threaded axially, a pair of threaded shafts associated with the threaded portions of the drum, whereby rotation of the drum by unreeling the cable will cause the shafts to be driven apart, wedge actuator members slidably mounted on the outer end of each shaft and having a portion extending concentrically over the ends thereof, a peripheral flange projecting laterally from each actuator member, a spring concentrically disposed, and a spring housing rigidly mounted on each shaft, each of said springs continuously urging its respective actuator member outwardly, rigidly mounted stops on the safety frame, retaining dogs pivotally mounted on the spring housings and so disposed that one end of each pivoted dog abuts a fixed stop and the other end thereof engages an actuator flange, whereby the actuator members will be normally held in retracted position in opposition to the associated spring and, when the drum is rotated, they will be released for projection by the springs at a more rapid rate than the shafts are driven outward because of the combined motion of translation and rotation of the dogs, and a pair of rail-gripping jaws associated with each actuator wedge member for actuation to rail-gripping position thereby.

7. In an elevator car safety device, a safety frame, a rotatably mounted internally threaded cable drum, a pair of threaded slidably-mounted shafts, associated with said drum, an actuator wedge member slidably mounted on the end of each shaft, a spring concentrically disposed on each shaft in abutting relation to the actuator member, a cylindrical spring housing concentrically disposed on each shaft, each of said housings having a closed end and rigidly secured to the shaft in abutting relation to the inner end of each spring, retaining dogs mounted in openings in the walls of each cylindrical housing, rigid stop members secured to the safety frame for engagement by the outer ends of said retaining dogs, a flange on the inner end of each actuator member for engagement by the inner ends of the retaining dogs, and a pair of rail-gripping jaws disposed in operative relation to each actuator member for actuation thereby to rail-gripping position.

8. A quick acting safety device for elevator bodies moving between guide rails comprising rail gripping jaws, wedge actuators, a cable drum, slidably mounted shafts threadably received by said drum, means for gradually moving said wedge actuators outwardly to operatively engage said jaws at a rate which is more rapid than the outward movement of the shafts as the drum rotates, means responsive to movement of the shafts for controlling said rate of movement, and means for thereafter applying an increasing force at a slower rate.

9. An actuator for operating the rail gripping jaws of an elevator safety device comprising a wedge shaped member, a shaft for slidably supporting the same, a compression spring concentrically disposed on said shaft for slidably moving the wedge actuator outwardly thereon and a stop for limiting the movement of the wedge actuator relative to the shaft.

JAMES DUNLOP.